United States Patent [19]
Broodman

[11] 3,902,035
[45] Aug. 26, 1975

[54] APPARATUS AND METHOD FOR ARC WORKING WORK-PIECES WITH A ROTATING ARC

[75] Inventor: Johannus J. Broodman, Breskens, Netherlands

[73] Assignee: B.V. Koninklijke Maatschappij "De Schelde", Vlissingen, Netherlands

[22] Filed: Nov. 30, 1973

[21] Appl. No.: 420,435

[30] Foreign Application Priority Data
Dec. 1, 1972 Netherlands .................. 72/16360

[52] U.S. Cl. ............ 219/121 P; 219/8.5; 219/101; 219/123; 219/137
[51] Int. Cl.² ......................................... H05B 31/28
[58] Field of Search .......... 219/74, 121 P, 123, 6.5, 219/8.5, 101, 104, 107, 121 R, 75, 137

[56] References Cited
UNITED STATES PATENTS

| | | | |
|---|---|---|---|
| 3,125,669 | 3/1964 | Hawthorne | 219/75 X |
| 3,287,539 | 11/1966 | Stevens | 219/123 X |
| 3,594,609 | 7/1971 | Vas | 219/123 |
| 3,660,630 | 5/1972 | Sunnen et al. | 219/121 P X |
| 3,705,975 | 12/1972 | Wolf et al. | 219/123 X |

OTHER PUBLICATIONS
"Welding by Means of a Rotating Arc," Briese & Henkel, Schweiss Technik, 19 (1969), Vol. 1.

*Primary Examiner*—Bruce A. Reynolds
*Attorney, Agent, or Firm*—Bucknam and Archer

[57] ABSTRACT

This invention relates to an apparatus for performing plasma arc welding by a process in which the plasma arc travels about a closed path or orbit on the work-piece. More particularly, the invention provides a plasma arc welding apparatus useful for performing butt welded joining of cylindrical work-pieces, such as pipes and rods, and for welding tubes to tube sheets.

The invention utilizes an annular slot nozzle which is operated with a gas for maintaining a plasma arc, and a generally ring-shaped electrode positioned in circumferentially opposed relation to the weld path. A magnetic field interacting with the plasma arc between the electrode and the work-piece causes the arc to travel around the weld path to perform welding therealong.

11 Claims, 3 Drawing Figures

APPARATUS AND METHOD FOR ARC WORKING WORK-PIECES WITH A ROTATING ARC

A similar apparatus is known from the article "Schweissen mit umlaufendem Lichtbogen" in "Schweiss Technik," 19 (1969), volume 1, and for example for butt welding together two pipes. For this purpose the electrode and the coil are arranged concentrically around the seam welded between the two pipes, after which the arc is ignited between the electrode and the end of the pipe. The electric field generated by the coil, which field has been directed perpendicularly to the plane of the annular electrode, in the annular space between the electrode and the seam to be welded, has a result that the arc is going to rotate around the seam to be welded. This results in the melting of the ends of both pipes, after which the welding-sides are pressed together, so that after the solidification of the melted metal a seam has formed between the two pipes.

In this well-known apparatus problems with the ignition of the arc appear and the arc shifts repeatedly during the first phase of the welding-process as a result of the low stiffness of the arc. Besides the speed of travel of the arc is low and irregular and the latter is mainly defined by the temperature of the arc. Only after sufficient heating of the welding-sides, the welding-process is getting stable to some degree. The direction control over the arc remains very low however, so that this arc is not able sufficiently to penetrate into the welding-material and only heats the surface to a large extent. As a result of this, it is not possible to obtain a seam of high quality and neither is it possible to guarantee an absolute tightness. During the solidification in particular with materials responsive to heat-cracking there can be shrink-cracks. So for instance this apparatus is not suitable for welding aluminum and its alloys.

The present invention provides an apparatus of a kind mentioned above, with which the disadvantages mentioned above are avoided and a weld of very high quality is obtained. The apparatus according to the invention is characterized by a nozzle enclosing the electrode with respect to the workpieces, providing an elongated nozzle-slot, limiting the arc on both sides and arranged between the edge of the electrode and the surfaces of the work-pieces to be worked means for supplying gas under pressure to the space inside the nozzle, so that the gas can be driven out with such a speed through the annular slot, that after the ignition of the arc a plasma arc is formed.

Basically, the invention provides a plasma arc welding apparatus which comprises means defining a generally annular slot nozzle disposed in circumferentially opposed spaced-apart relation to a closed curve weld path on a workpiece, said nozzle communicating with a gas supply for maintaining a plasma arc; a generally ring-shaped electrode disposed in circumferentially opposed spaced-apart relation to said weld path, said electrode being disposed for connection to a source of electric energy to establish a plasma arc between said electrode and weld path on the workpiece; and means establishing a magnetic field interacting with said plasma arc and causing said arc to travel around said weld path to perform welding therealong.

Although in the apparatus according to the invention the arc is not limited by massive walls on all sides, there nevertheless appears such a narrowing of the arc, that a plasma is formed with properties inherent to this, like stiffness, temperature and energy-contents.

In the apparatus according to the invention much higher temperatures are attained by the nature of the plasma arc than in the known apparatus, by which at similar high current values much higher circulation speeds of the arc occur. Because of this the advantage arises that it is possible to weld both with alternating current and with direct current, providing great advantages during welding aluminum or its alloys. The plasma arc generated in the apparatus according to the invention has a considerable penetration capacity, so that two workpieces can be placed flushly against each other and can be welded through completely. In the apparatus according to the invention there are not two phases, i.e., a preheating phase and a welding phase, as it is the case with the known apparatus, since in the apparatus according to the invention the arc reaches high temperatures almost immediately. The apparatus according to the invention is highly suitable for welding heat-crack sensitive material since a complete penetration is obtained over the whole circumference of the seam and while heat tension up on cooling are reduced considerably.

Since for the rest a complete tight weld is formed the apparatus is highly suitable for welding connections to ultra-centrifuges or similar nuclear enriching plants, where a large degree of seam tightness is required. At the same time the apparatus according to the invention is highly suitable to be used on the mountings, where all piping and parts already have been put into position and where there is no room and no clearance left for pressing the piping afterwards, which is required with the known apparatus.

A special advantage of the apparatus according to the invention is obtained, if the coil consists of one winding and is formed by the electrically interrupted electrode, provided with means for current supply and/or by the nozzle. Because of this a very compact apparatus is obtained. The electrode as well as the coil and the nozzle can be arranged in an annular housing of for example synthetic material, which housing is provided with a central aperture for passing the piping or other workpieces. Preferably the housing with the electrode and the nozzle will be implemented so that it can be hinged open according to an axial plane, for which purpose these parts are provided with the necessary hinges and clamps. The hinges are arranged on one side of an axial separating plane between the parts of the housing, that can be hinged open, and parts of the electrode and the nozzle.

The electrode and the nozzle, when used as a coil should be interrupted electrically at least at one place, while on both sides of the interruption means for current supply have to be placed so that the current is forced to pass the ring electrode or nozzle. This interruption surprisingly does not affect adversely the rotation of the arc.

The electrode may consist of proper electrical and heat-conducting material, like copper, or of heat-resisting material, like tungsten. In both cases water cooling can be applied both to the electrode and the nozzle.

The apparatus according to the invention can be used for welding flushly annular pipes with a nearly round cross-section, for which purpose the almost annular electrode is arranged concentrically with respect to the circular working path. According to the invention the nozzle slot is arranged such between the inner edge of the electrode and the work-pieces, that they extend almost parallel with the surface of the workpieces and in such a way, that the arc in passing its working-path is directed nearly radially with respect to the workpieces.

However the apparatus according to the invention can also be applied for welding pipes to a pipe plate or tube sheet, for which purpose the end of a pipe has to be welded to the surface of the plate. Also in this case an almost annular electrode is used, which, however, now is positioned in the extended direction of the pipe, opposite its end, the nozzle slot running almost parallel to the end and in such a way, that the arc in passing its working-path is directed axially with respect to the pipe.

Besides, the invention provides a method to treat workpieces according to a closed working-path, in particular the forming of a rotating weld between two workpieces with the aid of a rotating arc between the workpieces and an electrode extending opposite the working-path and an electric field, extending nearly perpendicularly to the path of the arc. The method according to the invention is characterized in that the path of the arc is limited on both sides by means of the nozzle slot arranged between the inner edge of the electrode and the working-path on the workpieces; while through the nozzle slot formed like this, a gas is supplied to the workpiece under such a pressure and with such a speed, that after generating the arc a rotating plasma arc is formed.

The invention will be explained further with the help of the figures showing some embodiments of the apparatus.

Figure 1:
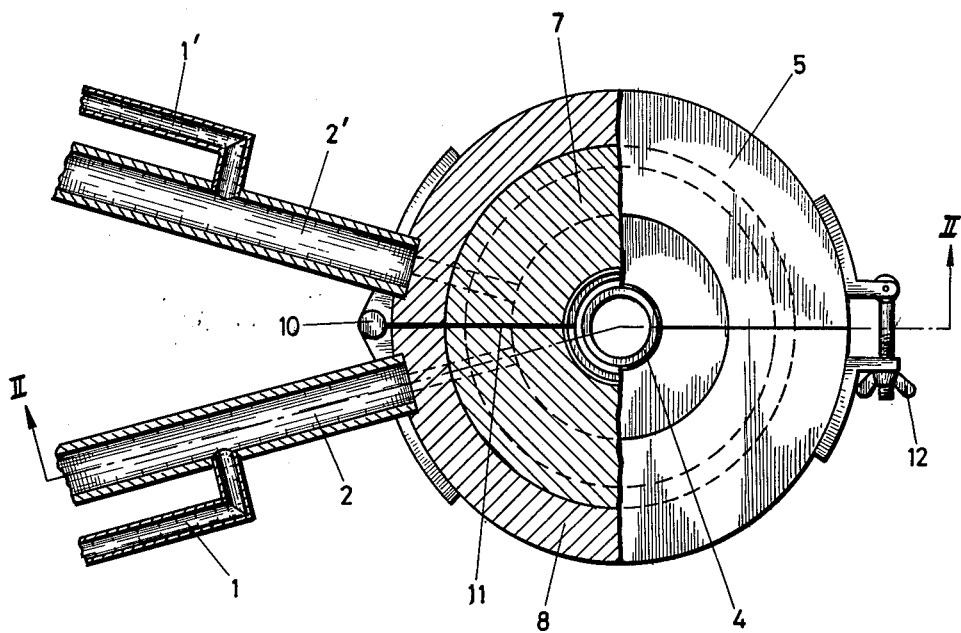
FIG. 1 shows a view partly in section of a welding apparatus according to the invention.

The welding apparatus according to the invention consists of a synthetic housing in the form of a broad ring 5. This ring 5 has been implemented in two parts, which have been connected with each other by the hinges 10 and are kept pressed together at the right with the aid of a clamp device 12, which either itself takes care of a good electric pressure contact between the two halves of the divided electrode 7, or is provided with an additional contact means.

The non-consumable annular electrode 7, which for example can consist of copper or tungsten, has been bedded in an electrical conducting support ring 8, preferably of material having a lower electrical conductivity than the electrode 7, for example stainless steel. This support ring 8 serves at the same time as a current supplying member for the electrode, in the embodiment shown both for the welding current and for the current which has to generate the electric field. Instead of the electrode also the parts 6 and 9 of the nozzle, which form slot 13 can serve as a coil consisting of one winding. In the latter case these parts have to be provided with means for current supply. Also the parts 6 and 9 of the nozzle have been bedded in the synthetic housing 5. The electrode 7 and the nozzle parts 6 and 9 are, when used as a coil, separated from each other at 11 by an insulating layer.

The pipes 4 are kept in place with the aid of the centre members 14, in which case the seam to be welded is arranged opposite the slot 13.

Figure 2:
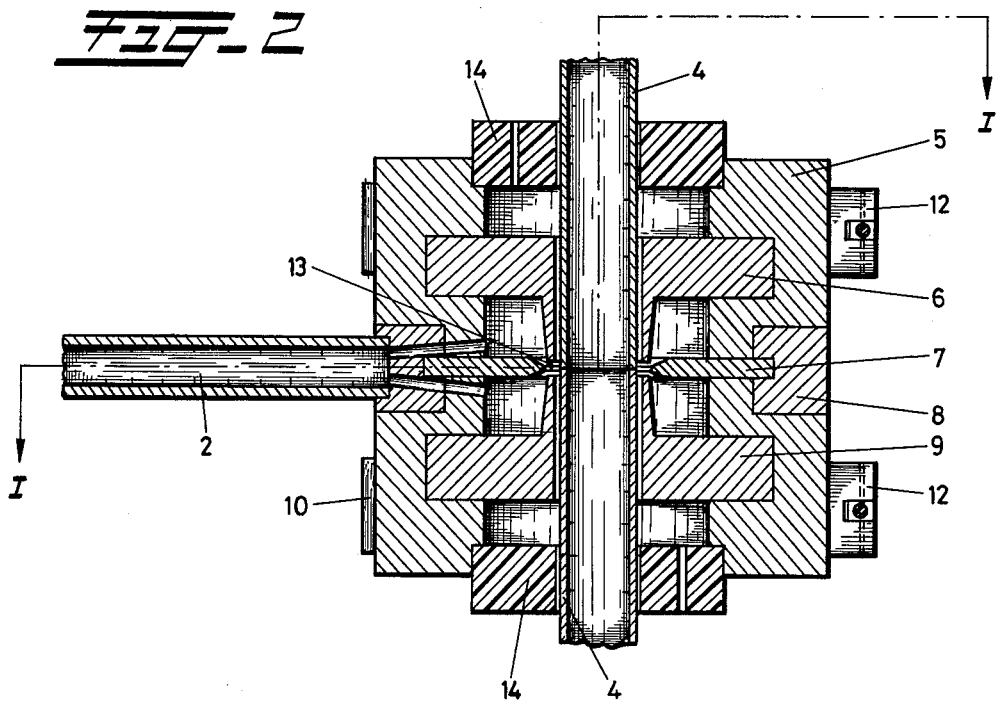
FIG. 2 shows the welding apparatus according to the invention in axial section according to the line I—I in FIG. 1.

In the FIG. 1 and 2 the means for current supply for the coil consisting of one winding, are displayed by 2 and 2'. These means for current supply for example can consist of hollow pipes, to which the conduits for gas supply are connected. By the latter conduits the usual screening gas, like argon and helium is supplied under pressure to the space inside the nozzle, which gas subsequently is blown out as a gas jet through the slot 13. Because of the narrowing effect of the nozzle parts in the slot 13, after that an arc has been ignited between the inner edge of the electrode 7 and the welding place formed by the ends of the pipes 4 arranged against each other, a plasma arc arises with comparable properties with respect to the conventional plasma burner, like an exceedingly high temperature and exceedingly high energy contents. As a result of the current through the annular electrode 7 or the nozzle parts 6 and 9 an electric field is generated, which, between the inner edge of the electrode 7 and the outer surface of the pipes 4, extends perpendicularly to the plane formed by this electrode 7 and the annular preworked parts of the pipe 4 to be connected. Because of this the plasma arc is going to rotate with high speed around the pipes 4, by which the welding connection is achieved.

Pipes with a diameter of for example 12 mm. with a wall thickness of 1 to 2 mm. can be welded within approximately 1.5 to 3 seconds. In an apparatus suitable for this the slot between the nozzle parts 6 and 9 is to 1 to 2 mm. wide. The welding current in this amounts to about 60 to 100 amperes, while the current through the electrode or nozzle parts in order to generate the field, can amount to 1500 to 2000 amperes.

Figure 3:
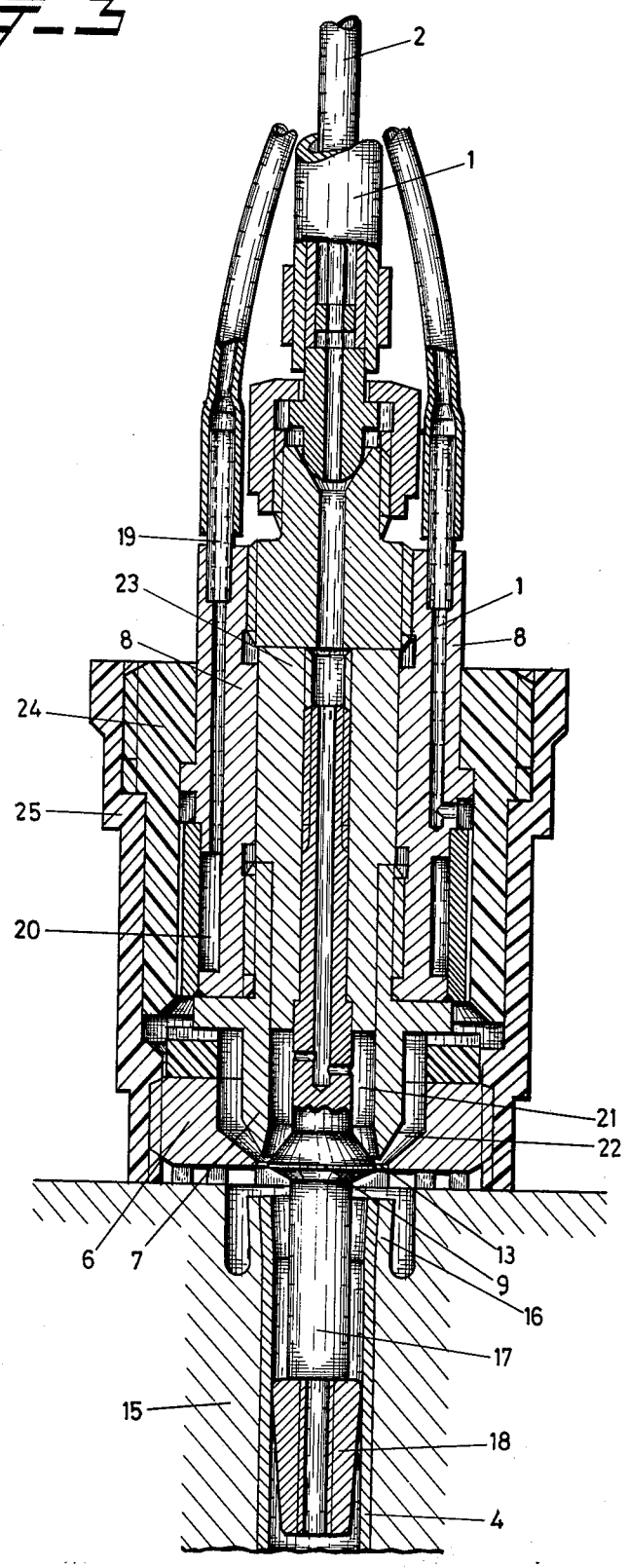
FIG. 3 shows a modified welding apparatus according to the invention, for welding pipes in a pipe-plate.

FIG. 3, in which for corresponding parts the same reference figures are used, shows an apparatus according to the invention for welding pipes 4 in a pipe plate 15.

The apparatus is provided with an annular electrode 7 and a nozzle, of which the nozzle slot 13 is limited by the inner edge of the part 6 on one side and the thickening 9 of the center handle 17 on the other side.

This center handle 17 is provided with a center member 18 on the lower end and extends upwards through the apparatus and at the same time the upperside has been provided with a conduit for the supply of argon screening gas to the part of the nozzle space 21 between the electrode 7 and the center handle 17. This screening gas is supplied on the upper side by way of the part 1 to the conduit in the center handle 17, while a further supply hose pipe has been displayed, which is connected with a conduit 1 in the electrode support 8. By way of this conduit the screening gas is supplied to the space 22 in the nozzle between the electrode 7 and the nozzle part 6.

The electrode support 8 has been provided with a conduit 19 in FIG. 3 on the left for the supply of cooling water to the space 20 which has been saved in the electrode support 8. The cooling water outlet has not been displayed. The electrode support 8 has been arranged between two cylindrical parts of synthetic material 23 and 24, of which the latter part has been embodied in a metal coating 25, which also supports the nozzle 6. This coating can be built up from separate detachable parts as a matter of course.

The coil consisting of one winding can be formed by the divided electrode 7, provided with current supply members, not displayed, or the nozzle part 6. The electric field has to be directed perpendicularly to the circular space between the lower end of the electrode 7 and the seam to be welded between the upper end of the pipe 4 and the preformed pipe part 16 in the pipe plate 15. It stands to reason that a preliminary treatment as displayed in 16 for the application of the apparatus according to the invention is not necessary. The conduction of the generated magnetic field can be improved, if necessary, with the aid of metal parts of the welding apparatus with low magnetic resistance. The magnetic field of the coil, formed by the electrode or the nozzle part 6, can be supplemented with the aid of, or replaced by a separate coil, which can be arranged for example coaxially with respect to the apparatus, outside the housing 25 and has not been displayed in FIG. 3.

After the supply of the welding current to the electrode 7 by way of the conductor 2, the supply of the current through the coil 7 or 6, the arc between the electrode and the end of the pipe 4 can be ignited. As a result of the screening gas supplied under high pressure to the spaces 21 and 22 through the narrowing of the arc in the slot 13, a plasma arc with very high energy contents and of high rigidity is generated. As a result of the radial magnetic field, this plasma arc is going to rotate over the end of the pipe 4 and the formed part 16. The pipe 4 can be welded to the plate 15 very quickly like this and at the same time owing to the application of the rotating plasma arc a gas tight weld of high quality is obtained.

In stead of the coil, formed by the electrode or the nozzle in the apparatus according to the invention, also permanent magnetics can be applied. It stands to reason, that the invention is not restricted to the embodiments described and displayed above, but that additions and modifications can be introduced, without enlarging the scope of the invention.

What we claim is:

1. A plasma arc welding apparatus, which comprises means defining a generally annular slot nozzle disposed in circumferentially opposed, spaced-apart relation to a closed curve weld path on a work piece, said nozzle communicating with a gas supply for blowing pressurized gas as a gas jet through said slot to said weld path; a generally ring-shaped electrode positioned within said nozzle defining means in circumferentially opposed, spaced-apart relation to said slot and said weld path, said electrode and said workpiece being disposed for connection to a source of electric energy to establish a plasma arc between said electrode and weld path on said workpiece by interaction of said arc and said gas jet blowing through said slot reducing the cross section of the arc with respect to a free burning arc; and means establishing a magnetic field interacting with said plasma arc and causing said arc to travel around said weld path, to perform welding therealong.

2. An apparatus according to claim 1 wherein said electrode is a single turn inductor and constitutes a part of the means establishing said magnetic field.

3. An apparatus according to claim 1 wherein the means defining said nozzle includes means defining a single turn inductor and disposed for connection to a source of electric energy to establish said magnetic field.

4. An apparatus according to claim 1 wherein said electrode is positioned concentrically with respect to a circular weld path defined by the abutting ends of two cylindrical workpieces.

5. An apparatus according to claim 1 wherein said electrode and nozzle have parts connected for pivotal movement to accommodate insertion of the workpiece.

6. An apparatus according to claim 1 wherein said electrode and nozzle slot are positioned concentrically with respect to a circular weld path located in a plane generally parallel to the nozzle slot.

7. An apparatus according to claim 5 including a housing supporting said electrode and nozzle, said housing having pivotally connected parts moveable in unison with said electrode and nozzle parts.

8. An apparatus according to claim 5 including an insulator positioned between said nozzle parts to interrupt current flow therebetween and make said nozzle define a single turn inductor.

9. An apparatus according to claim 5 including an insulator positioned between said electrode parts to interrupt current flow therebetween and make said electrode define a single turn inductor.

10. A method of plasma arc welding which comprises establishing a gas flow through an annular slot nozzle positioned in circumferentially opposed spaced-apart relation to a closed curve weld path on a workpiece; establishing a plasma arc through said gas flow and between said workpiece weld path and a ring-shaped electrode positioned in circumferentially opposed spaced-apart relation to said path; and establishing a magnetic field interacting with said plasma arc and causing said arc to travel around said path to perform welding therealong.

11. A method of plasma arc welding according to claim 10 wherein said plasma arc is laterally confined by said slot nozzle.

* * * * *